US005658661A

United States Patent [19]

Mitchell, Jr. et al.

[11] Patent Number: 5,658,661

[45] Date of Patent: Aug. 19, 1997

[54] MATTED RELEASE COAT FOR SELF-WOUND THERMAL PRINTABLE FACESTOCK

[75] Inventors: Chauncey T. Mitchell, Jr., Lakeland, Tenn.; James T. Wittig, Jr., Totowa, N.J.

[73] Assignee: Media Solutions, Inc., Lakeland, Tenn.

[21] Appl. No.: 520,757

[22] Filed: Aug. 29, 1995

[51] Int. Cl.[6] .................. B32B 7/12

[52] U.S. Cl. .................. 428/352; 428/354; 428/422; 428/447; 428/327

[58] Field of Search .................. 428/352, 354, 428/422, 447, 327

[56] References Cited

U.S. PATENT DOCUMENTS

| | | | |
|---|---|---|---|
| 3,987,225 | 10/1976 | Reed et al. | 428/43 |
| 4,074,000 | 2/1978 | Hankee et al. . | |
| 4,138,527 | 2/1979 | Malek . | |
| 4,253,899 | 3/1981 | Takemoto et al. . | |
| 4,415,615 | 11/1983 | Esmay et al. . | |
| 4,525,566 | 6/1985 | Homan et al. . | |
| 4,577,204 | 3/1986 | Shibata et al. . | |
| 4,587,156 | 5/1986 | Wu . | |
| 4,587,167 | 5/1986 | Maietti et al. . | |
| 4,708,907 | 11/1987 | Flutti et al. . | |
| 4,711,874 | 12/1987 | Yuyama et al. . | |
| 4,713,273 | 12/1987 | Freedman . | |
| 4,720,479 | 1/1988 | Craig et al. . | |
| 4,732,815 | 3/1988 | Mizobuchi et al. . | |
| 4,851,383 | 7/1989 | Fickenscher et al. . | |
| 4,861,651 | 8/1989 | Goldenhersh . | |
| 4,886,774 | 12/1989 | Doi . | |
| 4,891,260 | 1/1990 | Kunkel et al. . | |
| 4,898,849 | 2/1990 | Kang . | |
| 4,914,079 | 4/1990 | Takei et al. . | |
| 4,919,994 | 4/1990 | Incremona et al. . | |
| 5,049,434 | 9/1991 | Wasulko . | |
| 5,168,002 | 12/1992 | Maietti . | |
| 5,242,650 | 9/1993 | Rackovan et al. . | |
| 5,270,088 | 12/1993 | Grasse . | |
| 5,272,127 | 12/1993 | Mandoh et al. . | |
| 5,292,713 | 3/1994 | Stenzel et al. . | |
| 5,354,588 | 10/1994 | Mitchell et al. . | |
| 5,451,440 | 9/1995 | Tynan, Jr. | 428/422 X |

FOREIGN PATENT DOCUMENTS

| | | |
|---|---|---|
| 0295483 | 12/1988 | European Pat. Off. . |
| 0442823 | 8/1991 | European Pat. Off. . |
| 0600622 | 6/1994 | European Pat. Off. . |
| 59-107264 | 7/1984 | Japan . |
| 59-179071 | 11/1984 | Japan . |
| 60-54842 | 3/1985 | Japan . |
| 2165988 | 6/1990 | Japan . |
| 5177778 | 7/1993 | Japan . |

OTHER PUBLICATIONS

"Rising Thermals", *Packaging Week* Magazine, PW Info No. 124, Nov. 29, 1989, p. 27.

*Primary Examiner*—Daniel Zirker
*Attorney, Agent, or Firm*—Eugene Stephens & Associates

[57] ABSTRACT

A direct thermal printable facestock has an adhesive-coated back surface and a release coat applied over a layer of thermal imaging material on a front surface so the facestock can be wound and unwound without using a separate release liner. The release coat is composed of two release agents. One of the release agents is a solid such as tetrafluoroethylene ground into specifically sized particles, and the other release agent is a curable liquid such as silicone within which the particles of the solid release agent are embedded for mechanically cleaning the thermal print head.

10 Claims, 2 Drawing Sheets

MATTED RELEASE COAT FOR SELF-WOUND THERMAL PRINTABLE FACESTOCK

TECHNICAL FIELD

The invention relates to printable facestocks, especially self-wound facestock having opposite surfaces covered by adhesive and release coat, and to direct thermal printing of such facestocks.

BACKGROUND

Self-wound facestock has an adhesive-coated back surface; but instead of using a separate release liner to protect the adhesive coating prior to use, a release coat is applied to a front surface of the facestock. The release coat on the front surface of one coil of a roll contacts the adhesive on the back surface of an adjacent coil of the roll. Elimination of the liner saves costs and increases the length of the facestock in a given diameter roll.

Most release-coated surfaces have low adherence not only to adhesives but also to many inks as well. Accordingly, significant modifications are required to print on such release coats. For example, U.S. Pat. No. 4,708,907 suggests the addition of fine particles of inorganic filler such as talc, silica, and calcium carbonate to make release-coated surfaces more writable.

Direct thermal printable facestock is readily printable through release coat. In fact, the release coats have been found to enhance the transfer of heat between thermal print heads and underlying direct thermal printable layers. For example, Japanese Application No. 59-107264 discloses a self-wound facestock in which a release agent is applied to a direct thermal printable layer on one surface of a substrate and an adhesive layer is applied to the opposite surface of the substrate.

Dust and debris tend to accumulate on thermal print heads, especially when paper substrates are used, requiring periodic cleaning to maintain image quality. Generally, the print heads are manually cleaned after completion of a roll of facestock. Self-wound rolls of direct thermal facestock may extend the roll length by as much as sixty percent when compared to a lined facestock of the same diameter, so it is important to defer cleaning the print heads for an even longer duration. However, we have found that thermal print heads foul more quickly when printing through release-coated surfaces, possibly because the release-coated surfaces are not sufficiently porous or abrasive to transport debris past the print heads.

SUMMARY OF THE INVENTION

Our invention modifies the release-coat layer of self-wound direct thermal printable facestock to provide a matted surface that mechanically cleans thermal print heads while avoiding excessive wear and maintaining low adherence to adhesive. The matted surface is also writable and has a lower sheen that improves readability by laser scanning.

One example of our invention adds finely ground particles of (poly)tetrafluoroethylene (TEFLON) to a silicone release agent. A thin layer of the mix is coated on a direct thermal printable substrate. The particles of tetrafluoroethylene are relatively sized large enough to project through the silicone coating but small enough to maintain adequate transfer of heat between the thermal print head and the direct thermal printable substrate.

A layer of adhesive is applied to a back surface of the direct thermal printable substrate. The facestock is wound into a roll so that the release-coat layer of one coil of the roll contacts the adhesive layer of an adjacent coil of the roll. The silicone mix including the particles of tetrafluoroethylene exhibits low adherence to the adhesive so that the roll of facestock can be unwound and fed through a direct thermal printer.

Thus, both the silicone and the solid tetrafluoroethylene function as release agents for the adhesive. However, the silicone also functions as a binder for the solid tetrafluoroethylene, and the tetrafluoroethylene functions as a mild abrasive for cleaning thermal print heads. The particles of tetrafluoroethylene are preferably ground from a solid to a size between 1 micron and 30 microns and are preferably dispersed within a curable liquid silicone in a concentration between 10 percent and 30 percent by weight. After curing, the silicone forms a matrix within which the tetrafluoroethylene particles are mechanically bound.

The particles of tetrafluoroethylene embedded in the silicone also provide many ancillary benefits. For example, the particles dull the surface finish similar to other forms of matting, rendering the underlying printed material more readable by laser scanners. The surface is also more writable and is believed to protect the direct thermal printable layer from degradation by both radiant heat and ultraviolet radiation.

DRAWINGS

DETAILED DESCRIPTION

Figure 1:
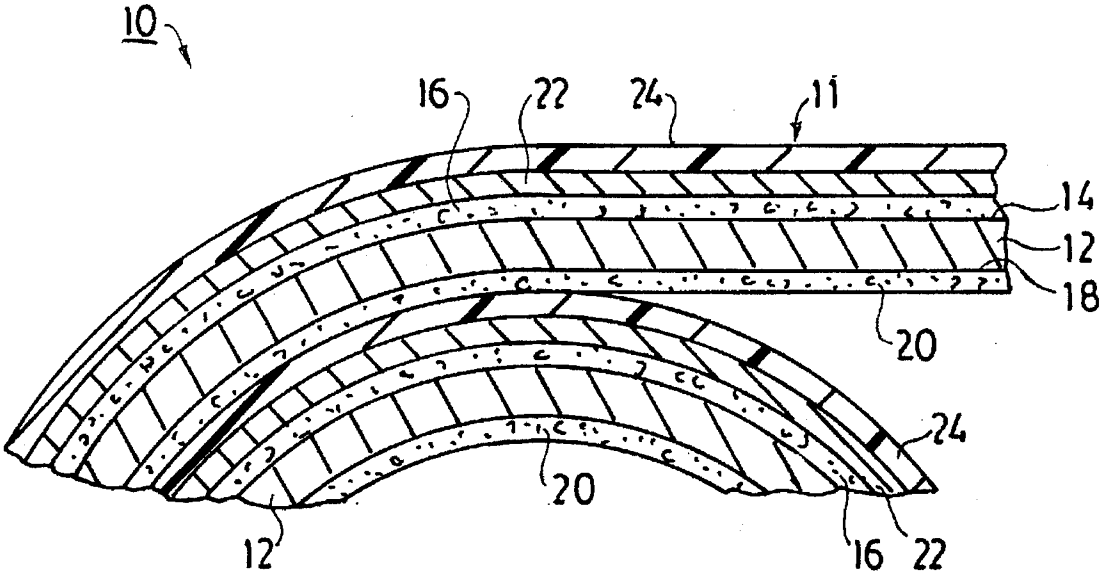
FIG. 1 is a greatly enlarged cross-sectional view of a roll of our new facestock.

A roll 10 of our new self-wound direct thermal printable facestock 11 is shown in FIG. 1. The exemplary facestock 11 is similar to a facestock disclosed in copending U.S. application Ser. No. 08/202,838, now abandoned, entitled SELF-WOUND DIRECT THERMAL PRINTED LABELS, but is modified to require less frequent cleanings of thermal print heads. This application is hereby incorporated by reference.

The facestock 11 includes a substrate 12 in the form of a continuous length web made of paper or film. A front surface 14 of the substrate 12 is coated with a thermally receptive imaging material 16, such as a solution of leuco dye and acid. Preferably, the coated substrate 12 is a thermal paper available from such sources as Kanzaki Specialty Papers of Ware, Mass. A back surface 18 of the substrate is coated with a layer of adhesive 20, which is preferably pressure sensitive but could also exhibit other qualities such as co-adhesion, repositionability, removability, and resistance to cold. The composition and pattern of the adhesive layer 20 is adjusted to meet the requirements of individual applications.

Successive layers of primer 22 and release coat 24 are applied to the thermally receptive imaging material 16. The primer 22, which is preferably a flexible primer, provides an improved mounting surface for the release-coat layer 24 and cooperates with the release-coat layer 24 to enhance flexibility of the facestock 11 and to protect the coated substrate 12 from a variety of environmental hazards including physical abrasion and water damage, as well as unwanted chemical interaction with the thermally receptive imaging material 16. Ultraviolet blockers can also be incorporated into a primer 22 such as disclosed in U.S. Pat. No. 4,886,774 to Doi, which is also hereby incorporated by reference.

Figure 2:
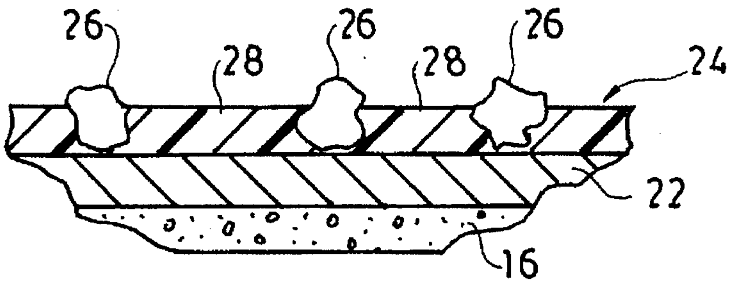
FIG. 2 is an even further enlarged view of a release-coat layer on the facestock showing the dispersion of solid release agents.

The layer of release coat 24 shown greatly enlarged in FIG. 2 is a special mix containing two release agents 26 and 28. The release agent 26 is a solid, such as (poly) tetrafluoroethylene (TEFLON), having a granular composition of specifically sized particles. The release agent 28 is a curable liquid, such as silicone, that also functions as a binder for the solid release agent 26. Both the primer 22 and the release agent 28 are preferably cured by ultraviolet radiation, although other curing methods including thermal evaporation and electron beam could also be used.

The solid particles of the release agent 26 are preferably sized between 1 micron and 30 microns and preferably comprise between 10 percent and 30 percent by weight of the total mix of release agents. An average size of 12.5 microns is preferred in a concentration of about 20 percent. However, further experience may yield more optimum parameters of the release-coat layer 24. The curable liquid release agent 28 has a thickness that is preferably less than the average particle size of the solid release agent 26, so the embedded particles of the release agent 26 project from the curable liquid release agent 28. However, the curable liquid release agent 28 has a preferred minimum thickness of at least one-half of the average particle size of the release agent 26 for forming strong mechanical bonds with the solid particles of the release agent 26.

Figure 3:
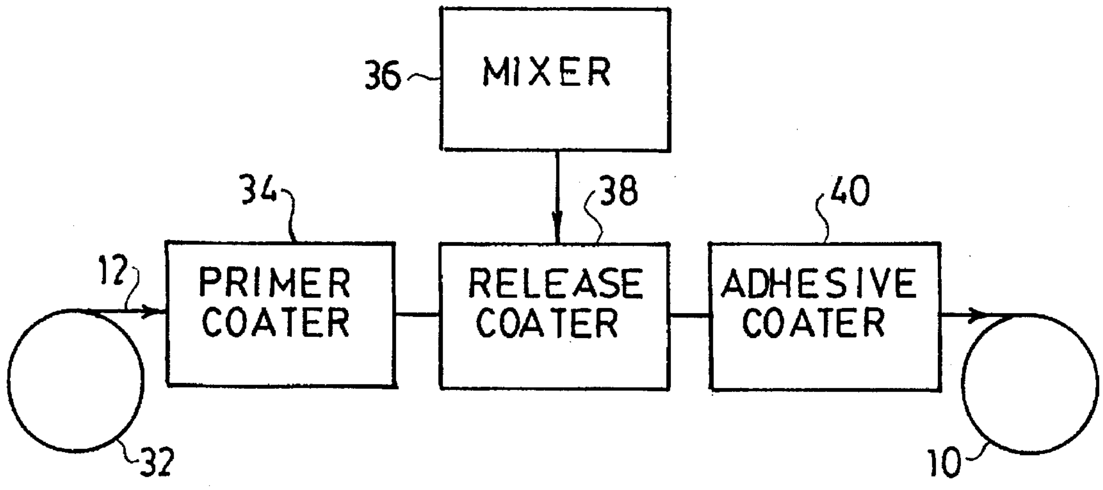
FIG. 3 is a diagram of an in-line system for making our new facestock.

A system for making the new facestock 11 is shown in FIG. 3. The substrate 12, which is precoated with thermally receptive imaging material 16, is unwound from a roll 32 and fed through a primer coater 34 for applying the primer layer 22. A mixer 38 combines the solid release agent 26 with the curable liquid release agent 28 so that the solid release agent 26 is suspended within the curable liquid release agent 28. A release coater 38 applies the mix of release coat 24 on the primer layer 22. The applied release coat 24 is then exposed to ultraviolet light for curing the liquid release agent 28 into a matrix for binding the solid release agent 26 in place.

An adhesive coater 40 applies the adhesive layer 20 to the back surface 18 of the substrate 12. Preferably, the adhesive layer 20 is applied as a hot melt while the substrate 12 is chilled to prevent thermal damage. The adhesive layer 20 could also be applied to the release-coat layer 24 and later transferred to the back surface 18 while rewinding. Other types of adhesives could also be used including water-based, solvent-based, and 100-percent solids.

The new facestock 11 is wound into the roll 10 with the adhesive layer 20 on one coil of the roll in contact with the release-coat layer 24 on an adjacent coil. The layer of release coat 24 exhibits low adherence to the layer of adhesive 20 so the facestock 11 can be unwound without any significant exchange of remnants between the separated layers of adhesive 20 and release coat 24. In fact, both release agents 26 and 28 exhibit low adherence to the adhesive layer 20, but the curable liquid release agent 28 bonds tightly to both the primer layer 22 and the solid release agent 26.

Figure 4:
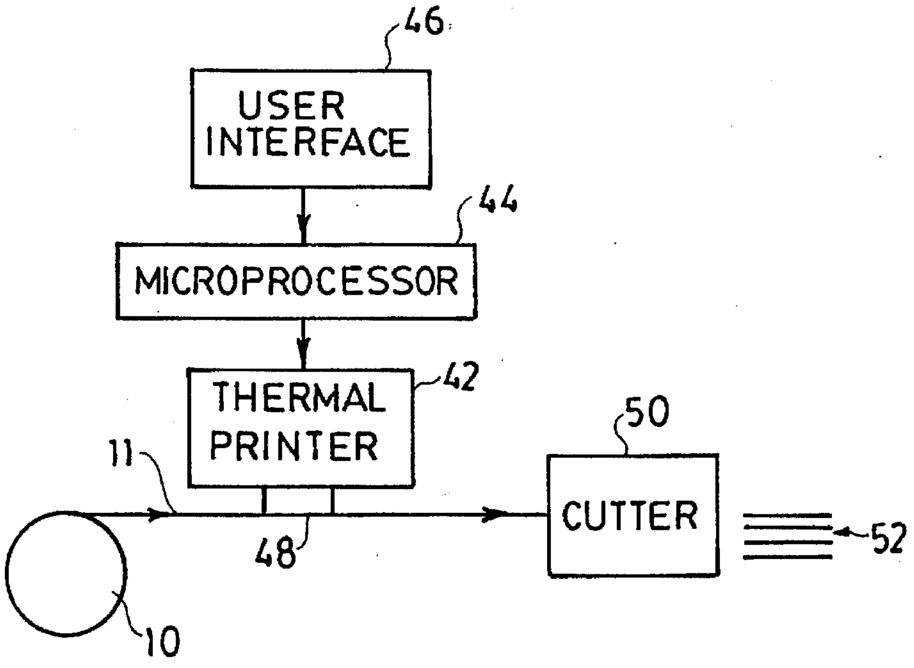
FIG. 4 is a diagram of a printing system for converting our new facestock into individually printed sheets.

FIG. 4 shows the roll 10 of facestock 11 arranged for supplying a direct thermal printer 42. A microprocessor 44 having a user interface 46 controls operation of the thermal printer 42 to produce images in the thermal receptive layer 16 of the substrate 12. The projecting particles of the solid release agent 26 mechanically clean a print head 48 of the thermal printer 42 of at least some debris to extend the length of facestock 11 that can be printed between regular cleanings.

A cutter 50 divides the facestock 11 into individual sheets 52, which can be used as self-adhesive labels, tags, or other attachable print media. Alternatively, the facestock 11 could be perforated and/or aligned with a tear bar for manually separating the facestock 11 into the individual sheets 52.

Although our system for making self-wound facestock 11 has been illustrated as a single-pass in-line system, the facestock 11 could also be made in a multi-pass system in which the facestock is unwound and rewound between processing steps. After completion of the processing steps, the facestock could be wound on paper or plastic cores, as well as "coreless" to further reduce waste material. However, the paper cores are preferably not used to avoid exposing the facestock to additional paper debris.

The facestock 11 could also be preprinted prior to coating with a variety of other non-thermal printing techniques (e.g., flexographic, letter press, offset press, silk screen, or ink jet) to add patterns or colors to either surface of the thermal printable substrate 12. Similar printing techniques could also be applied to the modified layer of release coat 24. The lower sheen of the release coat 24, resulting from the combination of release agents 26 and 28, makes the new facestock 11 especially suitable for containing printed information encoded for reception by laser scanners. The new combination of release agents is also expected to provide the underlying thermal imaging layer with a protective barrier against radiant heat and ultraviolet light.

We claim:

1. A roll of self-wound direct thermal printable facestock adapted for cleaning a thermal print head comprising:

a substrate having a continuous length and front and back surfaces;

a thermally receptive imaging layer on said front surface of the substrate;

an adhesive layer on said back surface of the substrate;

a release-coat layer on said thermally receptive imaging layer;

said substrate being wound into a plurality of coils so that said adhesive layer of one coil is in contact with said release-coat layer of an adjacent coil;

said release-coat layer comprising first and second release agents that both exhibit low adhesion to said adhesive layer;

said first release agent having a granular composition of solid particles; and said second release agent forming a matrix for embedding said first release agent in positions for mechanically cleaning the thermal print head.

2. The roll of claim 1 in which said solid particles of the first release agent are relatively sized large enough to project from said second release agent but small enough to maintain adequate transfer of heat between the thermal print head and said thermally receptive imaging layer.

3. The roll of claim 2 in which said second release agent has a layer thickness that is less than the particle size of the first release agent.

4. The roll of claim 3 in which said second release agent has a layer thickness that is at least one-half of the particle size of the first release agent.

5. The roll of claim 3 in which said solid particles are sized between 1 micron and 30 microns.

6. The roll of claim 2 in which said first release agent is dispersed within said second release agent in a concentration between 10 percent and 30 percent by weight of the combined dispersion.

7. The roll of claim 6 in which said first release agent is dispersed within said second release agent in a concentration of approximately 20 percent by weight of the combined dispersion.

8. The roll of claim 1 in which said second release agent is a curable liquid.

9. The roll of claim 8 in which said first release agent is a solid (poly)tetrafluoroethylene.

10. The roll of claim 9 in which said second release agent is a curable liquid silicone.

* * * * *

US005658661C1

(12) REEXAMINATION CERTIFICATE (4592nd)

United States Patent (10) Number: US 5,658,661 C1

Mitchell, Jr. et al. (45) Certificate Issued: Jun. 11, 2002

(54) MATTED RELEASE COAT FOR SELF-WOUND THERMAL PRINTABLE FACESTOCK

(75) Inventors: Chauncey T. Mitchell, Jr., Lakeland, TN (US); James T. Wittig, Jr., Totowa, NJ (US)

(73) Assignee: Media Solutions, Inc., Lakeland, TN (US)

Reexamination Request:
No. 90/006,100, Aug. 29, 2001

Reexamination Certificate for:

| | |
|---|---|
| Patent No.: | **5,658,661** |
| Issued: | **Aug. 19, 1997** |
| Appl. No.: | **08/520,757** |
| Filed: | **Aug. 29, 1995** |

(51) Int. Cl.$^{7}$ .................................................. B32B 7/12

(52) U.S. Cl. ........................ 428/352; 428/327; 428/323; 428/354; 428/447; 428/906; 428/422

(58) Field of Search ................................ 428/327, 354, 428/352, 447, 422, 323, 906

(56) References Cited

U.S. PATENT DOCUMENTS

| | | | |
|---|---|---|---|
| 4,054,697 A | 10/1977 | Reed et al. | 428/40 |
| 4,626,256 A | 12/1986 | Kawasaki et al. | 8/471 |
| 4,656,346 A | 4/1987 | Drexler | 235/487 |
| 4,684,675 A | 8/1987 | Collier | 523/220 |
| 4,740,055 A | 4/1988 | Kanda et al. | 428/144 |
| 4,839,123 A | 6/1989 | Duncan | 350/96.3 |
| 4,898,849 A | 2/1990 | Kang | 264/22 |
| 4,927,801 A | 5/1990 | Mahmud | 503/200 |
| 4,933,124 A | 6/1990 | Duncan | 264/22 |
| 4,958,173 A | 9/1990 | Fitch et al. | 346/160.1 |
| 4,999,334 A | 3/1991 | Mehta et al. | 503/226 |
| 5,075,369 A | 12/1991 | Mahmud | 524/475 |
| 5,141,914 A | 8/1992 | Kang | 503/226 |
| 5,217,758 A | 6/1993 | Greenleaf et al. | 427/387 |
| 5,332,797 A | 7/1994 | Kessel et al. | 528/27 |
| 5,462,587 A | 10/1995 | Greenleaf et al. | 106/2 |
| 5,462,911 A | 10/1995 | Takao et al. | 503/227 |
| 5,658,661 A | 8/1997 | Mitchell, Jr. et al. | 423/352 |
| 5,705,451 A | 1/1998 | Takao et al. | 503/227 |
| 5,968,996 A | 10/1999 | Sanchez et al. | 522/148 |
| 6,004,630 A | 12/1999 | Sanchez et al. | 427/515 |
| 6,015,615 A | 1/2000 | Sanchez et al. | 428/352 |
| 6,221,485 B1 | 4/2001 | Sanchez et al. | 428/352 |

FOREIGN PATENT DOCUMENTS

| | | |
|---|---|---|
| EP | 0 315 072 B1 | 5/1989 |
| GB | 1397943 A | 6/1975 |
| GB | 2 039 784 A | 8/1980 |
| WO | 96/40833 | 6/1996 |

OTHER PUBLICATIONS

Derwent Publications, Ltd., London, GB, An 85–240400, X9002016587 & JP, A, 60 158 249 (Shinetsu Chem Ind, KK), Aug. 19, 1985, see abstract.

*Primary Examiner*—Stephen Stein

(57) ABSTRACT

A direct thermal printable facestock has an adhesive-coated back surface and a release coat applied over a layer of thermal imaging material on a front surface so the facestock can be wound and unwound without using a separate release liner. The release coat is composed of two release agents. One of the release agents is a solid such as tetrafluoroethylene ground into specifically sized particles, and the other release agent is a curable liquid such as silicone within which the particles of the solid release agent are embedded for mechanically cleaning the thermal print head.

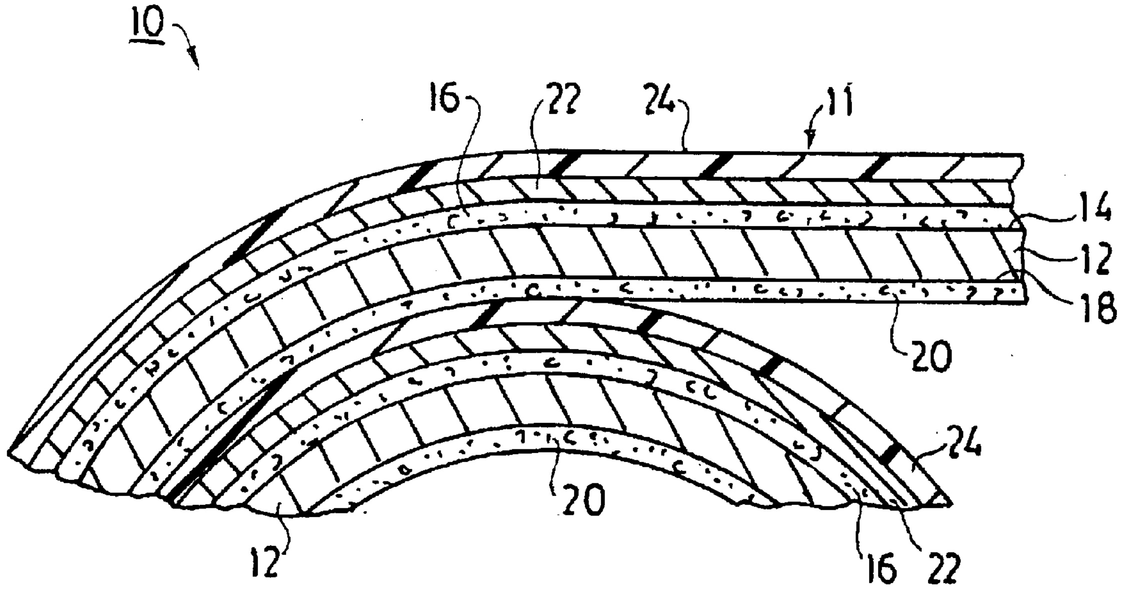

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *